United States Patent [19]

Landa et al.

[11] Patent Number: 4,540,282
[45] Date of Patent: Sep. 10, 1985

[54] APPARATUS FOR OPTICALLY ANALYZING A SAMPLE

[75] Inventors: Isaac J. Landa, 12109 Greenleaf Ave., Potomac, Md. 20854; Ronald Shideler, Rockville, Md.

[73] Assignee: Isaac Landa, Rockville, Md.

[21] Appl. No.: 477,634

[22] Filed: Mar. 21, 1983

[51] Int. Cl.$^3$ .............................. G01J 3/18; G01J 3/42
[52] U.S. Cl. .................................. 356/328; 356/319; 356/334
[58] Field of Search ............... 356/319, 323, 325, 326, 356/328, 331, 332, 333, 334

[56] References Cited

U.S. PATENT DOCUMENTS

| | | | |
|---|---|---|---|
| 3,040,222 | 6/1962 | Kunz | 318/676 |
| 3,756,721 | 9/1973 | Williams | 356/326 |
| 3,868,499 | 2/1975 | Aaronson et al. | 364/498 |
| 3,886,331 | 5/1975 | Schierer, Jr. | 364/526 |
| 3,985,442 | 10/1976 | Smith et al. | 356/326 |
| 4,093,991 | 6/1978 | Christie, Jr. et al. | 364/525 |
| 4,211,486 | 7/1980 | Magnussen, Jr. et al. | 356/334 X |
| 4,264,205 | 4/1981 | Landa | 356/326 |
| 4,285,596 | 8/1981 | Landa | 356/308 |
| 4,310,243 | 1/1982 | Brown et al. | 356/300 |
| 4,318,616 | 3/1982 | Chamran et al. | 356/332 |
| 4,330,210 | 5/1982 | Hashimoto et al. | 356/328 |

Primary Examiner—F. L. Evans
Attorney, Agent, or Firm—Saidman, Sterne, Kessler & Goldstein

[57] ABSTRACT

An electro-optical system for rapid, accurate spectral analysis of the reflectivity or transmissivity of samples. A concave, holographic diffraction grating is oscillated at high speed to provide a rapid scanning of monochromatic light through a spectrum of wavelengths. The grating drive system is an electrically driven mechanical oscillator which utilizes the back EMF of the oscillator motor to maintain oscillation at the desired amplitude and frequency. A passive optical shutter mounted to the grating alternately blocks the light entering and exiting the monochrometer as the grating is oscillated. The resultant dark period is utilized by the system to provide a reference offset value and to control cooling of the detectors. A unique phase-locked loop circuit is employed to provide sample commands at precisely determined intervals to correctly correlate the spectral data with the output of the monochrometer. Source and exit optics are employed to optimally shape the light passing through the system. A unique detection head is provided to allow measurement of light transmission or reflectance with only slight modification of the system. An optical fiber is used to divert light from the beam at or near the sample. This light is electronically detected and the electronic detection signal is used to adjust the gain of the sample signal so as to compensate for atmospheric bands, temporal variations, and system response. This provides a true double (dual) beam operation.

20 Claims, 12 Drawing Figures

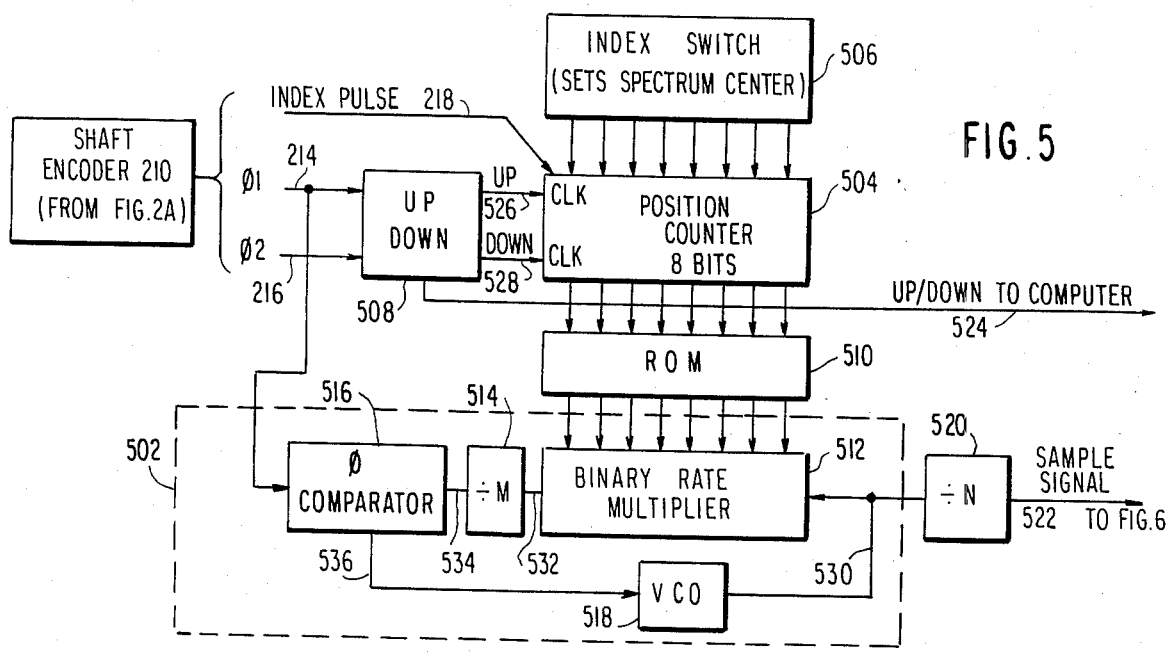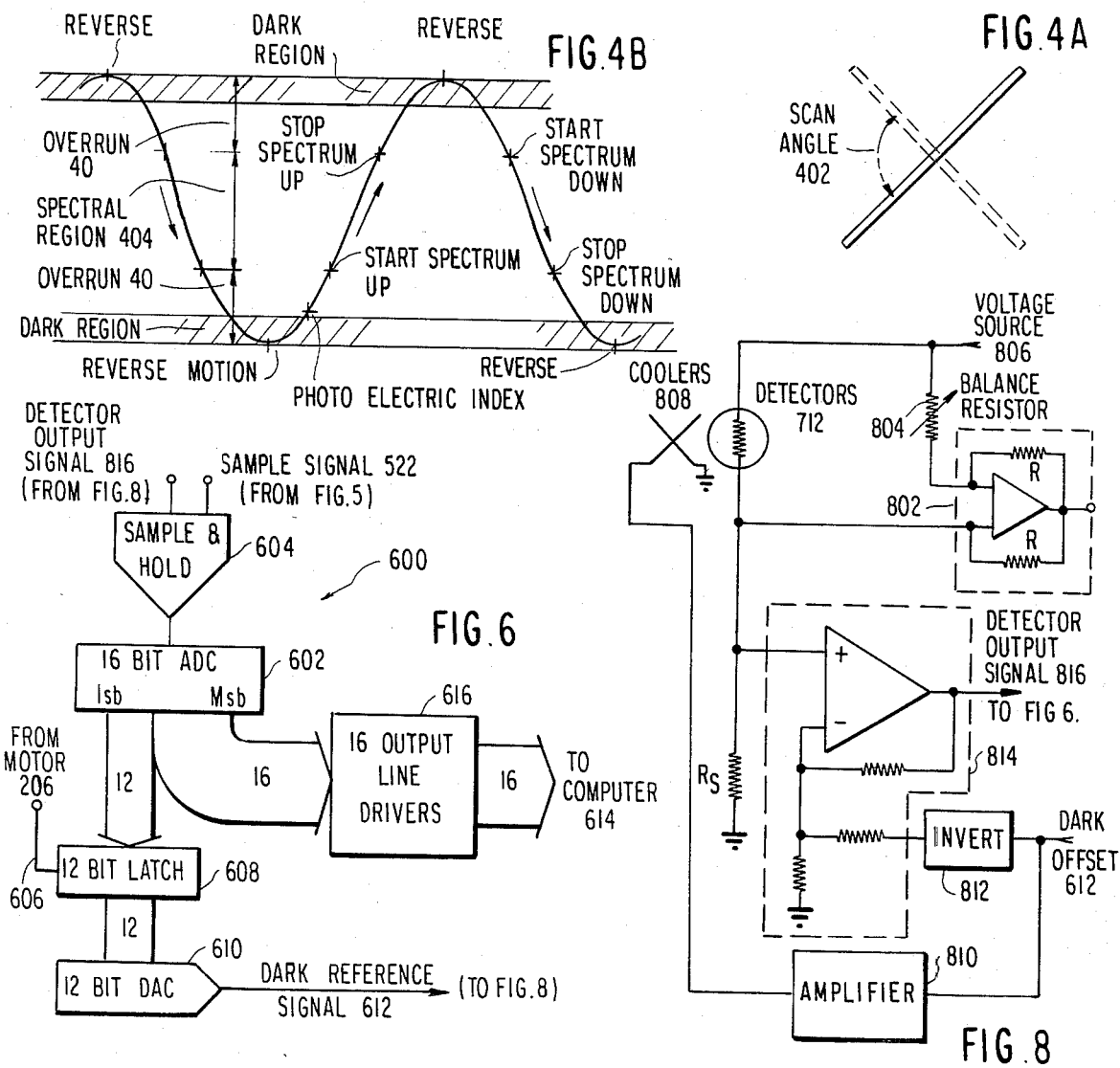

APPARATUS FOR OPTICALLY ANALYZING A SAMPLE

BACKGROUND OF THE INVENTION

The present invention relates generally to the field of instruments for spectrally measuring and analyzing optical properties of samples. Such instruments are presently used in industrial and agricultural application for colorimetry and for quantitatively analyzing the constituents of samples. Additional applications for such instruments are being developed in the field of medicine in which samples are spectrally analyzed for diagnostic purposes.

Examples of agricultural applications presently in use are instruments which accurately determine the oil, protein and water content in grain or soybeans. The traditional analytical laboratory techniques, such as the Kjeldahl technique for measuring protein, are extremely accurate but require the services of a skilled chemist. The results, furthermore, are not immediately or readily available. Buyers of agricultural products have demonstrated an increasing interest in accurate and rapid determinations of the moisture, protein and oil percentages of the various produces purchased. The wheat export market, for example, has seen the widespread introduction of selling on the basis of guaranteed protein content. This competitive pressure has increased the requirement of the commodity handler, from the country elevator to the export terminal, to sort rapidly and accurately grains and other products by their content, where applicable.

Additional agricultural and food applications include measurement of constituents in dairy products, cereal, beverages, fruits, meats, etc.

In the industrial market, this type of measurement is successfully applied to the following areas:

the textile industry for measuring lubrication on yarn and for fiber finish in nylon, polyester, cotton and others;

tobacco industry for measuring the percent of tar and nicotine;

paper industry for the chemical analysis of paper including coatings, thickness and moisture;

plastic industry for measurement of tapes and film thickness;

gasohol and petroleum industry for composition determination;

cosmetics and perfume industry for measurement of oils and other ingredients.

In the pharmaceutical industry, this instrument is applied for measurement and identification nondestructively of drug composition.

The need for versatile, yet low cost, advanced equipment, which combines and improves upon recent scientific findings in the field of nondestructive testing of products has greatly increased. For maximum usefulness of commodity handlers, such an instrument must not place high demands on the skillfulness of the operator or require a specialized knowledge of the scientific basis for the end result.

Recent developments have provided instruments which are able to satisfy some of the above requirements of commodity handlers. The optical analyzer disclosed by Issac J. Landa in U.S. Pat. No. 4,285,596 entitled "Holographic Diffraction Grating System for Rapid Scan Spectral Analysis" provides an optical system for rapid, accurate spectral analysis of the reflectivity and/or transmissivity of samples. A concave holographic diffraction grating oscillated at high speed is utilized to provide a rapid scanning of monochromatic light through a spectrum of wavelengths. The grating is positively driven at a very high speed (typically, ten scans per second) by a unique cam drive structure comprising identically shaped conjugate cams. The rapid scan by the grating enables reduction of noise error by averaging over a large number of cycles. The rapid scan also reduces measurement time, and thus prevents sample heating by excessive exposure of light energy. A filter wheel having dark segments for drift correction is rotated in the optical path in synchronism with the grating. Source optics is employed to shape optimally the light source for the particular application. The system optics further includes an arrangement of lenses, including cylindrical lenses, to obtain the best light source shape which results in maximum light throughput. Fiber optics are also employed and arranged to meet the optimum requirements of the system for light collection and transmission through portions of the optical system.

A related instrument is disclosed by Isaac J. Landa in U.S. Pat. No. 4,264,205, entitled "Rapid Scan Spectral Analysis System Utilizing Higher Order Spectral Reflections of Holographic Defraction Gratings", which is a continuation-in-part of the previously mentioned Landa patent. The disclosed optical system is similar to that shown in its parent application, but includes a filter wheel divided into two arcuate segments separated by opaque segments arranged approximately 180° apart. One arcuate segment of the wheel transmits only first order light. The other arcuate segments transmits only second order light. Separate photodetectors are employed during infrared analysis of samples for detecting first order and second wavelength transmissions, and an electronic decoder apparatus is utilized for switching between detectors.

The discussions of the related art contained in the two Landa patents are incorporated by reference into this document.

The analyzers disclosed in the two Landa patents suffer from a number of disadvantages. First such optical analyzers are limited in the accuracy of their measurement by the particular drive mechanism employed for oscillating the diffraction grating. Specifically, the complex cam drive mechanism employed to provide a linear spectral scan is relatively costly and inaccurate. The cam drive mechanism is needed to control the variation in the velocity of the grating during each scan in order to obtain the desired linear spectral scan. The complex cam drive mechanism introduces error in the analysis because of the very tight tolerances required of the camming surfaces.

Another disadvantage is that the filter wheel employed for blocking the light to provide a dark offset value requires careful synchronization with the oscillating of the grating to ensure that the light is blocked at the appropriate time. This increases the likelihood of error as well as increasing the number of parts in the analyzer.

Still another disadvantage of the former analyzers is that the transmissivity and reflectivity of samples is measured by different detectors. This approach introduces an additional variable into the analysis of the samples, which necessarily compounds errors. The requirement of two sets of detectors also increases costs.

SUMMARY OF THE INVENTION

The present invention is an electro-optical apparatus and method for rapid, accurate spectral analysis of the reflectivity or transmissivity of samples. Broadly, the present invention comprises a light source for emitting a broadband spectrum of wavelengths in the desired range of analysis, a monochrometer for dispersing light from the light source and for providing a spectral scan at its output, and a detector for measuring monochromatic light reflected or transmitted by the sample being analyzed.

The monochrometer of the present invention includes a concave, holographic diffraction grating oscillated at a high speed to provide a rapid scanning of monochromatic light through a spectrum of wavelengths. The grating is driven by an electrically-controlled mechanical oscillator which utilizes the back EMF of the oscillator motor to maintain oscillation at the desired amplitude and frequency. Specially designed source and exit optics are employed to shape optimally the light as it passes through the system. A passive optical shutter mounted to the grating alternately blocks light entering and exiting the monochrometer as the grating is oscillated. The resultant dark period is utilized to provide a reference offset value or signal and to control cooling of the detectors. A unique phase-locked loop circuit is employed in the present invention to provide sample commands at precisely determined intervals to correctly correlate the spectral data with the output of the monochrometer.

The instrument of the present invention has a grating drive system employing an electrically driven mechanical oscillator comprised of a precision bearing assembly motor mount, a two-pole brushless motor, and a flat return-force spiral spring. It should be understood that the configuration of the spring can vary and can include configurations such as the spiral spring, the axial helix spring, the torsion bar, the single-leaf spring, as well as non-linear springs or multiple spring arrangements. The mass of the grating and force constant of the spring produce a natural harmonic oscillator having a sinusoidal motion. The intrinsically smooth performance of such a mechanical system, having no high frequency components for vibration, makes it ideal for use as a precision scanner. The electronics to drive the torque motor of the harmonic drive is a feedback circuit which supplies just enough energy to maintain oscillation at the desired amplitude. The circuit makes use of the back EMF generated by the torque motor to determine how much energy is needed to maintain the desired amplitude. The frequency of this oscillation is controlled by the force of the spiral spring.

In lieu of the conventional complex cam drive mechanism, the present invention electronically provides sample commands at precisely determined intervals in order to correlate correctly the spectral data with the output of the monochronometer. The electronics consists of a phase-locked loop circuit which receives pulses from an inexpensive shaft encoder. The phase-locked loop tracks the sinusoidal motion of the grating, corrects for the non-uniform relationship of the grating equation of wavelength to incident angle, and provides resolution enhancement of the shaft encoder.

The present invention further provides a unique optical shutter coupled to the holographic diffraction grating which serves the purpose of the filter wheel in the conventional instruments. Since the action of the light shutter is passive, synchronization is assured. Moreover, the assembly reduces the number of moving parts in the system.

Finally, the present invention includes a unique detector stage which allows the same detectors to be used for measurement of the transmissivity or reflectivity of samples with only minor modification. The detectors are advantageously placed in a specially designed detector head which includes a removable mirror assembly. In the transmission mode, the sample is placed before the detector head, and the detector head is directed toward the incidental light. Light passing through the sample is reflected off the mirror assembly in the detector head and into the detectors. In the reflectance mode, the mirror assembly is removed, the detector head is rotated 180° so that the detectors face away from the light source. The entire detector head is placed before the sample. Light from the monochronometer passes through an aperture in the detector head (previously occupied by the mirror assembly) and is reflected off the sample and back to the detectors.

The instrument optionally can be a double beam instrument as follows. An optical filter is used to divert light from the beam at or near the sample. This light is electronically detected and the electronic detection signal is used to adjust the gain of the sample signal so as to compensate for atmospheric bands, temporal variations, and system response. This provides a true double (dual) beam operation.

BRIEF DESCRIPTION OF THE DRAWINGS

Further objects and advantages of the present invention will become apparent by reference to the following detailed description of the preferred embodiment considered in conjunction with the accompanying drawings, in which:

FIG. 2, comprising

FIG. 4, comprising FIGS. 4A and 4B, is a representation of the scan angle of the grating and the events that occur as the grating is oscillated;

FIG. 5 is a block diagram of the phase-locked loop circuit for providing sample pulses to the detector electronics of the present invention;

FIG. 6 is a circuit diagram of the data acquisition electronics of the present invention;

FIG. 7, comprising FIG. 8 is a circuit diagram of the detector electronics of the present invention.

DETAILED DESCRIPTION OF THE PREFERRED EMBODIMENT

Figure 1:
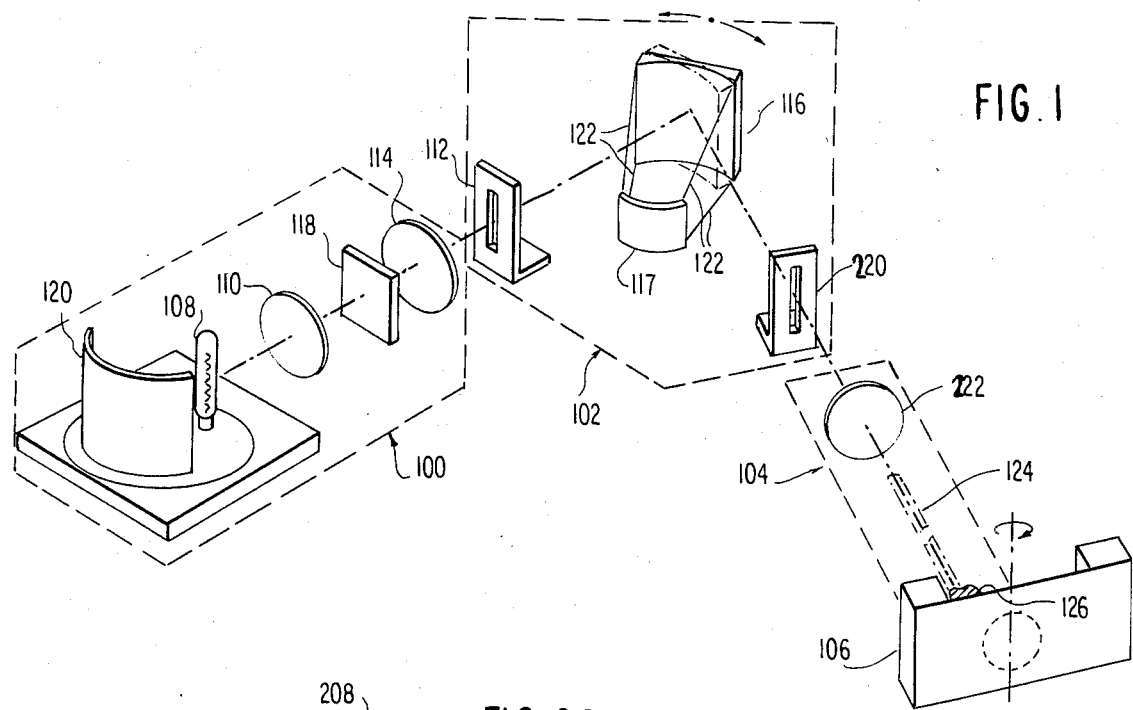
FIG. 1 is a perspective view of the optical components and layout of the present invention.

Briefly, and referring first to FIG. 1, the present invention is an electro-optical system and method which provides a rapid, accurate spectral analysis of the reflectivity and/or transmissivity of samples 126. A light dispersing element 116, preferably a concave, holographic diffraction grating, is sinusoidally oscillated at a preselected high speed to provide a rapid scanning of monochromatic light through a selected spectrum of wavelengths. The present invention includes a simple and elegant drive mechanism 200 (See FIGS. 2A and 2B) for sinusoidally oscillating grating 116. The sinusoidal oscillation of grating 116 produces a scan of monochromatic light which is expanded at both ends and compressed in the middle of the frequency spectrum with respect to time. The grating 116 also exhibits a non-linearity in the monochromatic light output, since the grating equation of monochromatic wavelength λ to incident angle Φ of light focused on grating 116 is non-uniform. This non-linearity results in the spectrum created during the scan being compressed at one end and expanded at the other by a relatively small amount as compared to the expansion and compression produced by the sinsusoidal oscillation. The present invention electronically compensates for both of these non-linearities by providing sample commands of the detector(s) analog output(s) at precisely determined intervals of time. This allows the present invention to produce digital output data correlated to the spectral scan of monochromatic light. The present invention further includes a passive optical shutter, which allows an offset signal to be produced. This offset signal is used (1) to provide an offset value for detectors 712 (see FIG. 8) and (2) to control temperature compensation of detectors 712 to insure that they operate in a desired temperature range. The present invention also can include a single detector assembly 106 which allows measurement of reflectivity and transmissivity without a change of detector(s) 812.

A representative illustration of the optical aspects of the system and method of the present invention is shown in FIG. 1. Broadly, the optical aspects of the present invention comprise a source optics stage 100, a monochrometer stage 102, an exit optics stage 104, and a detector stage 106. Light passing through the system generally follows the path indicated by the dot, dash line in FIG. 1.

Source optics stage 100 provides a properly focussed broadband beam of light to monochrometer stage 102. A broadband light source 108 emits light energy used by the present invention. Any type of suitable light source may be used which emits broadband light in the desired spectral range, which range is over the wavelength region that corresponds to ultraviolet (UV), through visible, through near infrared (NIR) and up to infrared (IR). In the preferred embodiment, a tungsten halogen lamp for source 108 is used for measurement in the near infrared range. On the other hand, for measurement in the ultraviolet range, a xenon light source might be used, for example. In the preferred embodiment, an indicator lamp (not shown) is lit as an indication that light source 108 is functioning properly.

A spherical lens 110 collects light emitted from light source 108 and images such light on an entrance slit 112 of monochrometer stage 102. A field lens 114, adjacent to entrance slit 112, focusses light incident from lens 110 to assure proper filling of dispersing element 116.

Optionally, a stationary filter 118 is located adjacent to field lens 114 to eliminate undesired wavelength orders from light source 108. Obviously, stationary filter 118 is not necessary with a light source 108 which emits light only in the desired spectral range, or with a detector 112 which detects light energy only in the desired spectral range. Stationary filter 118 may consist of a high pass, a low pass, or a band pass filter as required by the particular application. Moreover, the exact location of filter 118 is not critical. For instance, filter 118 could be located in exit optics stage 104.

An optional ellipsoidal mirror segment 120 is located behind light source 108 and serves to maximize light throughput by redirecting light into entrance slit 112. Mirror segment 120 is positioned with respect to the filament of disclosed light source 108 so as to double the amount of energy entering the monochrometer stage 102.

The monochrometer stage 102 is now described with reference to FIG. 1. Monochrometer stage 102 functions to separate the broadband light provided by light source 108 into its spectral components. Monochrometer stage 102 is comprised of entrance slit 112, dispersing element 116, a passive optical shutter 117, and an exit slit 220.

Dispersing element 116 is filled with the light entering monochrometer stage 102 through entrance slit 112. Dispersing element 116 separates incident light into its spectral components. Therefore, when dispersing element 116 is sent into oscillatory motion, a spectral scan of monochromatic light is produced at exit slit 220.

In the preferred embodiment, dispersing element 116 is a concave holographic diffraction grating. In a concave holographic grating, the lines of the grating are formed by a holographic techniques. Concave holographic gratings are presently available on the market and are marketed by Instruments, S.A. of Metuchen, N.J. The use of a concave grating is preferable to other light dispersing elements such as plane grating systems because it involves the use of a single optical component as opposed to three or more optical components required in plane grating systems. As a result, the alignment in calibration procedures are simplified and the cost of precision mechanical mounts are reduced. The use of a concave holographic grating makes possible the design of a system with low F numbers, for example as low as F/1 in some cases. High performance plane grating systems are usually limited F/4 and higher. The lower optical F numbers makes it possible to pass a greater amount of light energy through the optical system thereby making it possible for the present invention to analyze darker samples than possible by conventional optical analyzers. In addition, holographic gratings are free of ghosts and have a lower stray light level in comparison to rule gratings. Another advantage of the holographic grating used in the system of the present invention is that it can be made with a very high groove density which enables high resolution while maintaining high light energy throughput. Yet another advantage of the holographic grating is that it is corrected for astigmatic aberration and spherical and coma aberration are also reduced.

It should be understood, however, that any suitable optical dispersing element, such as a plane grating or a prism (not shown), could be used for dispersing element 116 in the present invention.

Light shutter 117 is provided in order to obtain an offset signal for zeroing the output of the detectors 712. In the preferred embodiment, light shutter 117 consists of a passive synchronous light chopper constructed of a light aluminum foil, and attached to concave holographic grating 116 by four rigid wires, designated by reference number 122. It should be understood that light shutter 117 can be constructed of any suitable material and can employ any suitable mounting structure.

The width of entrance slit 112 and the width of exit slit 220 are adjustable to enable selection of an optimal spectral bandwidth for the particular application. The entrance and exit slit planes are also adjustable to permit the use of a wide range of dispersing components.

Figure 2B:
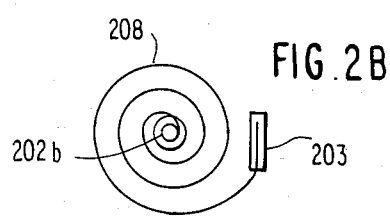
FIGS. 2A and 2B, illustrates the grating drive system of the present invention.
Figure 2A:
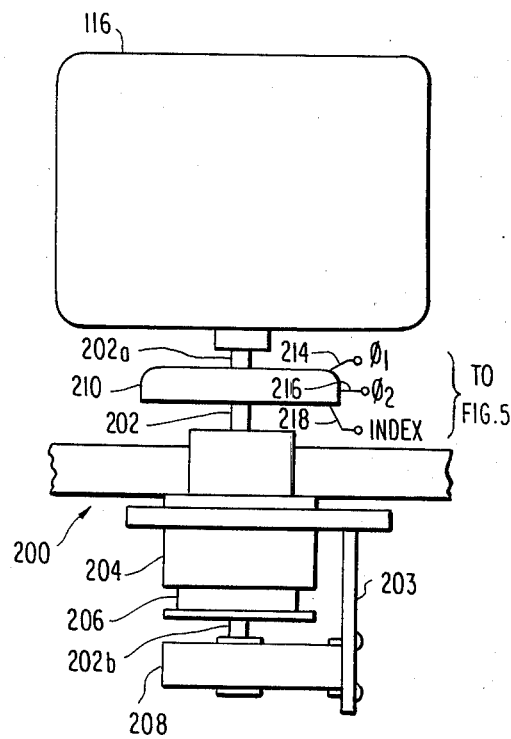

Holographic diffraction grating 116 is made to oscillate at a very high speed by means of a grating drive system 200. As shown in FIG. 2A, grating drive system 200 is an electrically driven mechanical oscillator comprising a shaft 202 (having an upper end 202a and a lower end 202b), a precision bearing assembly motor mount 204, a 2-pole brushless motor 206, and a flat spiral return force spring 208 (having an inner end 208a and an outer end 208b). As shown in FIG. 2B, the lower end of 202b of shaft 202 is secured to the inner end 208a of spring 208. The outer end 208b of spring 208 is securely fastened to a stationary piece 203 fixedly attached to mount 204. It should be understood that the configuration of spring 208 can vary and can include configurations such as the spiral spring, the axial helix spring, the torsion bar, the single-leaf spring, as well as non-linear springs or multiple spring arrangements.

Referring again to FIG. 2A, grating 116 is mounted on the upper end 202a of shaft 202. The mass of grating 116, and the force constant of spring 208, together produce a natural harmonic oscillator having a sinusoidal motion. Once set into motion, the drive system 200 would theoretically oscillate forever, but for the friction of the bearings in motor mount 204. A small drive voltage, described below with reference to FIG. 3A, is applied to motor 206 to produce controlled torque which acts to compensate for the friction in the oscillator system 200. Since oscillator system 200 requires no direct mechanical drive, it has an intrinsically smooth performance with very little vibration, making it ideal for use as a precision scanner. Additionally, the simplicity of drive system 200, and its relatively small number of parts, makes it highly reliable.

The sinusoidal motion of grating drive system 200 produces a corresponding sinusoidal spectral scan of monochromatic light with respect to time. Advantageously, the system electronics shown in FIG. 5 (described below) accurately compensate for this non-linearity. In conventional systems, such system electronics is not present, necessitating a grating drive system 200 which produces a linear scan. Such a drive system, as described in U.S. Pat. No. 4,285,596 to Landa requires a complex cam drive mechanism, which is costly and inaccurate relative to the simple and reliable drive system 200 of the present invention.

The oscillating system 200 of FIGS. 2A and 2B further includes a shaft encoder 210. Shaft encoder 210 provides three outputs: $0_1$ and $0_2$ (designated by reference numerals 212 and 214, respectively), and an index pulse 216. These signals are used by the system electronics of FIG. 5 for producing an output to sample the detectors 812 at the appropriate intervals of time corresponding to discreet wavelength increments of monochromatic light, as will be described in greater detail below.

Figure 3:
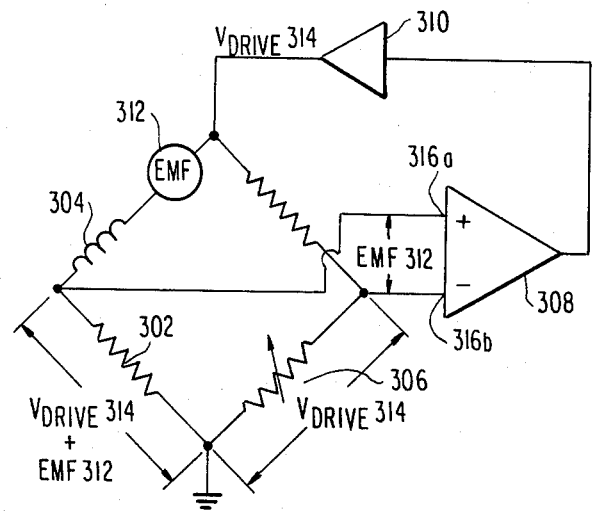
FIG. 3 is a circuit diagram showing the electronics utilized to drive the motor of the grating drive system.

Referring now to FIG. 3, the electronics to drive torque motor 206 is a feedback circuit which supplies just enough energy in the form of a drive signal 312 to maintain oscillation of grating 116 at the desired amplitude (i.e., a scan angle 402). As is well known, electric motors produce a back EMF (electromagnetic flux) which is proportional to the rotational velocity of the motor.

The circuit of FIG. 3 makes use of a back EMF signal 312 generated by torque motor 206. Note that the back EMF, is masked by the drive voltage 312, which has a much greater amplitude. The circuit uses a balanced bridge arrangement to extract the back EMF signal 310. In the circuit, a metering resistor 302 is connected in series with the motor coil 304. A potentiometer 306 is adjusted so that the drive voltage on line 314 is balanced out and only the pure sinusoidal back EMF signal 310 appears across the inputs 316a and 316b of an operational amplifier 308.

Both amplitude (the scan angle 402) and frequency (the number of scans in a defined time period) of oscillating system 200 are easily and precisely adjusted. The amplitude is controlled by electronically limiting the current level of drive signal 314 by employing a drive amplifier 310 in the feedback loop of the motor control electronics of FIG. 3.

Referring now to FIG. 4A, in the preferred embodiment, the amplitude of oscillation of grating 116 is set to limit scan angle 402 to approximately 42°. As shown in FIG. 4B, the central 25° portion (designated by reference numeral 404) covers the spectral range of interest, leaving approximately $7\frac{1}{2}$° overrun (reference numbers 406a and 406b) at either end. The overrun regions 406a and 406b are advantageously used for storing a dark offset value described below. It should be understood that the minimum scan angle 402 is determined by the angle needed for complete blockage by the light shutter 117.

The frequency of the oscillation of grating 116 can be varied by adjusting the force of spring 208 in FIG. 2. The frequency of oscillation preferably is in the range of 5 to 500 cycles per minute, which is 10 scans to 1000 scans per minute. A preferred frequency is 300 cycles per minute, or 10 scans per second. Because the holographic grating 116 is oscillated at a very high speed, the present invention eliminates noise by electronically averaging output data over a large number of scans. In the preferred embodiment, a lamp (not shown) is provided which flashes once per scan as an indication that oscillating system 200 is functioning properly.

In order to measure spectral reflectivity or transmissivity in discrete wavelength increments, the output of detector(s) 712 must be sampled at precisely determined intervals. This is necessary to correlate correctly the spectral data with the output of monochrometer 102. The absolute position of grating 116 must be known throughout the scan in order to produce the desired correlation. Moreover, repeatability of angular position is critical. In order to obtain one nanometer ($10^{-9}$ meter) wavelength resolution of output light for the concave holographic diffraction grating of the preferred embodiment, the 25° spectral region 404 must be divided into 1200 sample points. In other words, for the particular grating 116 employed in the present invention, the output of detector(s) 812 must be sampled 1200 times per scan to achieve an output of one data measurement for each wavelength increment of one nanometer. This is the equivalent of 48 sample points per degree of scan of spectral region 404.

Conventional shaft encoders can provide the 48 sample points per degree resolution, but are quite expensive and produce outputs only at uniform increments of incident angle. Further, due to the non-uniform relationship of the grating equation of wavelength $\lambda$ to incident angle $\Phi$, the spectrum created during the scan is compressed at one end and expanded at the other. Therefore, the circuit of FIG. 5 is used to enable spectra of a uniform wavelength resolution to be produced, without the need of an expensive shaft encoder.

Referring to FIG. 5, a phase-locked loop circuit 502 is shown which provides three functions. Firstly, phase-locked loop circuit 502 tracks the sinusoidal motion of oscillating grating 116 to provide detector sample commands at the correct intervals of time (note that since the motion of grating 116 is constantly changing, these time intervals are constantly changing). Second, phase-locked loop circuit 502 adjusts these intervals by a small amount to compensate for the slight non-linearity of the grating 116 output to incident angle of light input. Third, phase-locked loop circuit 502 provides an enhancement of wavelength resolution by producing a number of output pulses (at correctly spaced intervals) for each output pulse from shaft encoder 210. This allows the use of an encoder for encoder 210 which produces significantly fewer output pulses than would otherwise be required for the desired one nanometer resolution. The output of phase-locked loop circuit 502 is thus a series of correctly timed commands for sampling the analog output of detectors 812 of detector stage 106.

The three reference signals 212, 214, and 216 from shaft encoder 210 provide a frequency reference to phase locked-loop circuit 502. Two of the reference signals, $0_1$ (214) and $0_2$ (216), which are produced at equal increments of scan, indicate the absolute angle of grating 116. The $0_1$ (214) and $0_2$ (216) signals are square waves, separated in phase by 90°. The phase relationship of these two signals $0_1$ (214) and $0_2$ (216) is indicative of the direction of scan of grating 116.

The third reference signal, index pulse 218, is produced by shaft encoder 210 at the start of each scan. Index pulse 218 is used to initialize a position counter 504 (8 bit) by loading in the contents of a preset switch 506. In this manner, the lower limit (i.e., the start) of the spectral scan is established.

The $0_1$ (214) and $0_2$ (216) signals are fed to an up-down logic unit 508, which determines the direction of scan from the phase relationship of the pulses. Based on the direction of scan, up-down logic unit 508 either feeds UP clock pulses on a line 526 or DOWN clock pulses on a line 528 to position counter 504. Up-down logic 508 has the special property of identifying the direction of rotation unambiguously to avoid count error. An UP/DOWN signal 524 from up-down logic 508 is also forwarded to a utilization device such as a computer 614 (FIG. 6, not shown) for proper analysis of the data from detector(s) 712.

Position counter 504 addresses a read only memory (ROM) 510 (8×8 bits), which stores the adjustment information for correcting the non-linear relation between angular position 0 and wavelength. The data addressed in ROM 510 is fed to a binary rate multiplier 512, which functions as an 8 bit programmable divider. As grating 116 rotates across the spectral region 404, binary rate multiplier 512, in conjunction with data from ROM 510, slightly alters the frequency of the output on a line 530 of the phase-locked loop circuit to adjust for the non-linearity of grating 116. The resultant signal on a line 532 is then fed to a divide-by-M counter 514 to provide enhancement of resolution. In order to track the sinusoidal motion of grating 116, the frequency of the output from divide-by-M counter 514 on line 534 is compared with the frequency of the $0_1$ (214) signal by a phase comparator 516. The resultant output on line 536 is fed to a voltage-controlled oscillator (VCO) 518, whose output on a line 530 is thereby forced to a value so that the frequency of the two signals ($0_1$ (214) signal and the signal on line 534) compared by phase comparator 516 is equal. Since the output of VCO 518 is greater in frequency than the sample rate that the system requires, the output signal on line 530 is fed to a divide by N counter 520 to produce the resultant sample signal 522.

As is discussed below, detector stage 106 includes detectors 712 which each produce an analog voltage indicative of the amount of light incident on its detector surface. A data acquisition system, designed generally by reference numeral 600, shown in FIG. 6, produces a digital word representative of the detector 712 analog output each time a sample command on a line 522 is received from the circuit of FIG. 5.

Data acquisition system 600, is comprised of a sample-and-hold circuit 604 and a 16-bit analog-to-digital (A/D) converter 602. Sample and hold circuit 604 receives an adjusted detector output signal on line 816 (from FIG. 8) and the sample signal on line 522 (from FIG. 5). Thus, sample-and-hold circuit 604 captures the analog output of detectors 812 on each sample command from line 522. The held analog signal is then processed by A/D converter 602 to convert the held analog value to a digital binary word, for example, 16 bits in length. Sixteen bit resolution (one part in 65,536) is employed in the preferred embodiment to provide a dynamic range of measurement of more than four orders of magnitude without resorting to range switching, log amplifiers, or other means of adjusting the gain to suit the signal amplitude.

Data acquisition occurs only over spectral region 404. For each sample signal present on line 522, a 16-bit word is generated and sent to computer 614 via line drivers 616. A transmission of 1,200 readings, for example, comprises one spectrum scan.

As discussed above, a light shutter 117 is attached to grating 116. As grating 116 oscillates, light shutter 117 enters the light beam and alternately blocks the light from reaching or leaving grating 116. During the resultant "dark" periods, a signal is produced by the detector stage 106. This signal is used as the system reference to zero the detectors, and is further used to control the temperature stability of the detectors. Obviously, any suitable shutter could be applied in the system. For example, a filter wheel synchronized with the oscillatory motion of grating 116 could be used to block the light once per scan.

Just prior to the start of the scan of spectral region 404, when shutter 118 is blocking the light path, a single reading of dark offset is taken. The sample signal for this dark sample is derived from the change in direction of motor 206, and is indicated by a signal on a line 606.

Dark current compensation is accomplished by latching the dark offset reading in a 12-bit digital latch 608. Note that only the twelve least significant bits are necessary, since the dark offset value will always be much lower in amplitude than the spectral scan data. The twelve latched bits of dark reference data are converted to an analog voltage by a 12-bit digital-to-analog (D/A) converter 610. This analog voltage offset value, present on a line 612, is applied to the circuit of FIG. 8 to zero the measurements of the spectrum transmission in the subsequent scan. Additionally, this analog voltage is used to control thermal stabilization of detectors 812.

Referring again to FIG. 1, exit stage 104 functions to focus the monochromatic light provided at the output of exit slit 220 onto the sample 126. The light exiting monochrometer 102 may be focussed directly onto sample 126 by spherical lens 222, or may optionally be directed to a fiber bundle 124, which carries the light to the location of sample 126.

Detector stage 106 functions to collect the light passing through sample 126 in the transmissive mode, or reflected off sample 126 in the reflective mode. Detector stage 106, shown in greater detail in FIGS. 7A, 7B and 7C, comprises a solid detection head 702 and the sample 126 to be measured. Detection head 702 can comprise any suitable structure for collecting light from sample 126. In a preferred embodiment, detection head 702 includes a pair of angled mirrors 706 mounted on a removable triangular unit 708, an aperture 710, and four detectors 712, shown in greater detail in the front view of detector head 702 in FIG. 7C.

Figure 7A:
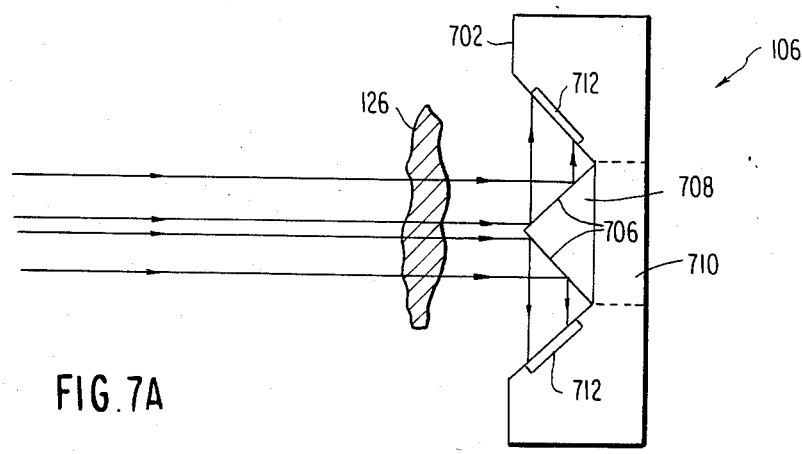
FIGS. 7A, 7B, and 7C, is an illustration of the detector stage of the present invention.
Figure 7B:
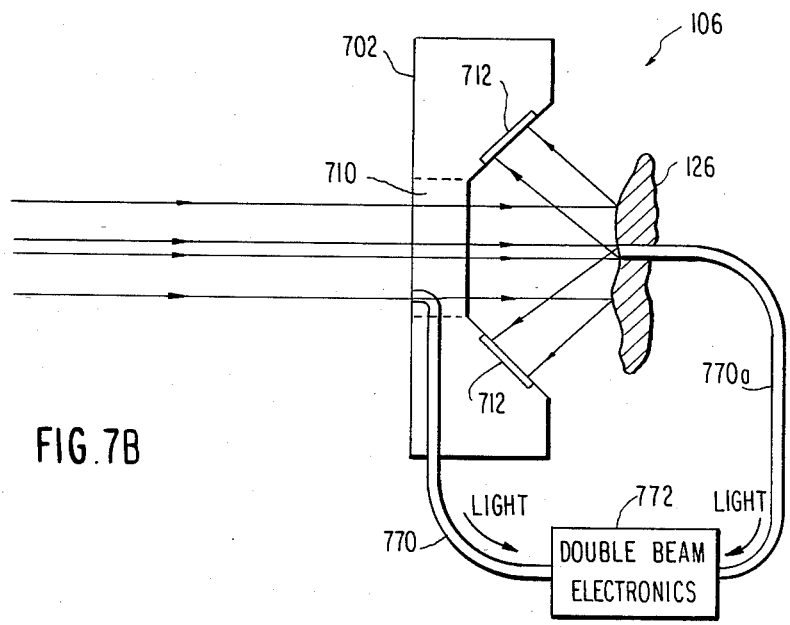

As shown in FIG. 7A, detection head 702 is configured for measurement in the transmissive mode. However, as illustrated in FIG. 7B, detection head 702 may also be used in the reflective mode. For measurement of reflection, detection head 702 is rotated 180°, and sample 126 is placed on the opposite side of detection head 702. Mirror unit 708 is removed so that light passes through aperture 710 and is reflected off sample 126 onto detectors 712. The beam on sample 126 can have a line shape, which is primarily advantageous for samples in motion, or it can have a circular shape for stationary samples. Detectors 712 are selected to match the spectral range being measured, and may consist of, for example, silicon, lead sulfite or lead selenide detectors, or photomultiplier tubes.

Figure 7C:
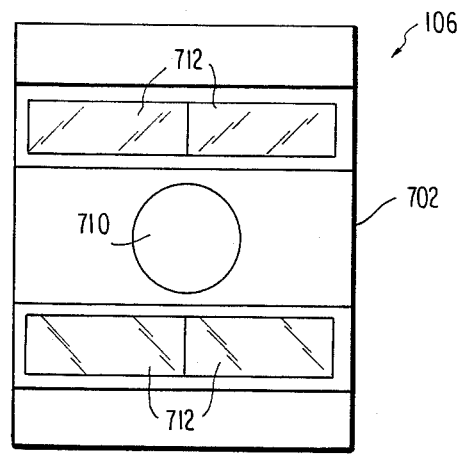

Referring to FIG. 7C, it should be noted that detectors 712 are positioned parallel to the long axis of the exit slit 120. This allows detectors 172 to be brought closer to the light beam axis, which results in collection of more reflected light with no interference of specular light. This arrangement is superior to the conventional approach where the detectors are equally spaced in a circular array about the light beam axis because it takes into account the variation in beam divergence in the horizontal and vertical directions.

FIG. 8 illustrates the detector system electronics. In the preferred embodiment, detectors 712 are operated in the photoconductive mode. Therefore, a bias is required. A current mirror bridge, designated generally by reference numeral 802, a modification of the Howland constant current-source, supplies the bias to detectors 712. Current mirror bridge 802 acts as a constant current sink, which draws an equal amount of current through the detectors 712 and a balance resistor 804.

Advantageously, the use of current mirror bridge 802 requires only a single power supply for biasing detector(s) 712. Note that in a conventional bridge configuration, a positive and a negative power supply is required. Furthermore, since the balance arm of the current mirror bridge (i.e., balance resistor 804) is connected to the same voltage source (designated 806) as detectors 712, any variation in voltage source 806 is cancelled out of the signal produced. Finally, the constant current sink of current mirror bridge 802 appears to detector 712 as a very low impedance. The signal applied to the non-inverting input of the operational amplifier of a stage 814 is collected as a voltage developed across resistor Rs or, alternatively, is provided by a current-to-voltage converter.

The detector system electronics also includes detector coolers 808 for maintaining detectors 712 at a constant temperature. Thermal stabilization is controlled by the thermal properties of detectors 712 themselves by applying the dark reference signal 612 acquired by the data system (FIG. 6) as an error signal to an amplifier 810 driving coolers 808. A reference signal 612 in the negative direction indicates a "too warm" condition, which causes amplifier 810 to deliver a larger current to coolers 808, resulting in cooling of detectors 712. Conversely, a positive dark reference offset signal 612 results in less cooling, allowing detectors 712 to warm to the desired temperature.

Dark reference offset signal 612 is also inverted by inverter 812 and added to the output from detectors 712 via summing circuit 814 to form the adjusted detector output signal on line 816.

The present invention optionally can provide true double (dual) beam operation. Referring to FIG. 7B, an optical fiber optic 770 has a first end disposed in aperture 710 of detection head 702 to divert a small amount of light from the beam passing through aperture 710 at or near the sample 126. This light is propagated by optic fiber 770 to its second end, which is optically coupled to a double beam electronics stage 772, which converts the propagated light to an equivalent electronic signal used to produce an electronic detection signal. The electronic detection signal is effectively used to adjust the gain of the sample signal 552 so as to compensate for atmospheric bands, temporal variations, and system response. This provides a true double (dual) beam operation.

Alternatively, optical fiber 770 can be moved to occupy the position of an optical fiber 770a, shown also in FIG. 7B. Optical fiber 770a is disposed so as to pass through the middle of sample 126, so that the first end of fiber 770a is at sample 126 for receiving the light beam passing through aperature 710 and hitting the sample 126. It should be understood that the first end of fiber 770 or 770a can be moved to other positions adjacent sample 126 which allow it to receive a portion of the light at or adjacent the sample 126.

Obviously, numerous modifications and variations of the present invention are possible in light of the above teachings. It is therefore to be understood that within the scope of the appended claims, the invention may be practiced otherwise than as specifically described herein.

We claim as our invention:

1. Apparatus for optically analyzing a sample, comprising:
   (a) first means for generating light having a preselected spectrum of wavelengths, and for focussing said spectrum onto an entrance plane;
   (b) monochrometer means disposed to receive said spectrum focussed onto said entrance plane for providing a spectral scan of monochromatic light onto an exit plane, comprising:
      (i) a torque motor having a drive shaft, said drive shaft having a first end and a second end;
      (ii) means for diffracting said spectrum focussed onto said entrance plane into said spectral scan of monochrmatic light provided onto said exit plane, said means for diffracting attached to said first end of said drive shaft;
      (iii) a support having a first end and a second end, said first end effectively attached to said torque motor;
      (iv) spring means having a first end and a second end, said first end of said spring means attached to said second end of said support, said second end of said spring means being mounted to said second end of said drive shaft; and (c) second means for focussing onto said sample said spectral scan of monochromatic light provided onto said exit plane.

2. The apparatus as recited in claim 1, wherein said first means comprises:
 (a) a light source emitting said light having a said preselected spectrum of wavelengths; and
 (b) means for optically focussing onto said entrance plane said light having a preselected spectrum of wavelengths.

3. The apparatus as recited in claim 2, wherein said means for optically focussing comprises means for filtering said light having a preselected spectrum of wavelengths.

4. The apparatus as recited in claim 1, wherein said torque motor comprises a 2-pole brushless motor.

5. The apparatus as recited in claim 1, wherein said means for diffracting comprises a holographic diffraction grating.

6. The apparatus as recited in claim 1, wherein said monochrometer means further comprises means for driving said torque motor.

7. The apparatus as recited in claim 6, wherein said means for driving comprises:
 (a) means for sensing the operation of said torque motor to provide a back EMF signal; and
 (b) means for controlling said means for driving in accordance with said back EMF signal.

8. Apparatus for optically analyzing a sample, comprising:
 (a) first means for generating light having a preselected spectrum of wavelengths, and for focussing said spectrum onto an entrance plane;
 (b) monochrometer means disposed to receive said spectrum focussed onto said entrance plane for providing a spectral scan of monochromatic light onto an exit plane;
 (c) means mounted to said monochrometer means for alternately blocking said spectrum focussed onto said entrance plane and said spectral scan of monochromatic light provided onto said exit plane; and
 (d) second means for focussing onto said sample said spectral scan of monochromatic light provided onto said exit plane.

9. The apparatus as recited in claim 8, wherein said first means comprises:
 (a) a light source emitting said light having a preselected spectrum of wavelengths; and
 (b) means for optically focussing onto said entrance plane said light having a preselected spectrum of wavelengths.

10. The apparatus as recited in claim 8, wherein said monochrometer means comprises a holographic diffraction grating.

11. The apparatus as recited in claim 8, further comprising means for sensing said spectral scan of monochromatic light focussed onto said sample in accordance with said means for alternately blocking for providing an offset signal.

12. The apparatus as recited in claim 11, further comprising means for adjusting said means for sensing as a function of said offset signal.

13. The apparatus as recited in claim 11, further comprising means for effecting temperature compensation of said means for sensing as a function of said offset signal.

14. The apparatus as recited in claim 8, further comprising:
 (a) detector means for detecting said spectral scan of monochromatic light transmitted by said sample or reflected by said sample;
 (b) means for producing an offset signal in accordance with said spectral scan of monochromatic light detected by said detecting means when said means for alternately blocking has blocked either said spectrum focussed onto said entrance plane or said spectral scan of monochromatic light provided onto said exit plane.

15. The apparatus as recited in claim 8, wherein said means for alternately blocking comprises a passive optical shutter.

16. Apparatus for optically analyzing a sample, comprising:
 (a) first means for generating light having a preselected spectrum of wavelengths, and for focussing said spectrum onto an entrance plane;
 (b) monochrometer means disposed to receive said spectrum focussed onto said entrance plane for providing a spectral scan of monochromatic light onto an exit plane, said monochrometer means including a holographic diffraction grating mounted for oscillatory motion about a first axis of rotation;
 (c) phase-locked loop means for providing a first signal by sensing the position of said holographic diffraction grating relative to said first axis of rotation; and
 (d) second means for focussing onto said sample said spectral scan of monochromatic light provided onto said exit plane.

17. The apparatus as recited in claim 16, wherein said phase-locked loop means further comprises means responsive to said first signal for producing a second signal to correct for any non-linearity caused by said holographic diffraction grating in providing said spectral scan of monochromatic light.

18. The apparatus as recited in claim 16, wherein said phase-locked loop means further comprises means responsive to said first signal for compensating for non-linearity in said spectral scan of monochromatic signal caused by the oscillatory motion of said holographic diffraction grating.

19. The apparatus as recited in claim 16, wherein said phase-locked loop means further comprises means responsive to said first signal for improving the resolution of said sensing of the position of said holographic diffraction grating relative to said first axis of rotation.

20. The apparatus as recited in claim 16, wherein said phase-locked loop means further comprises means responsive to said first signal for generating a sample signal in accordance with the position of said holographic diffraction grating relative to said first axis of rotation.

* * * * *